Patented June 4, 1940

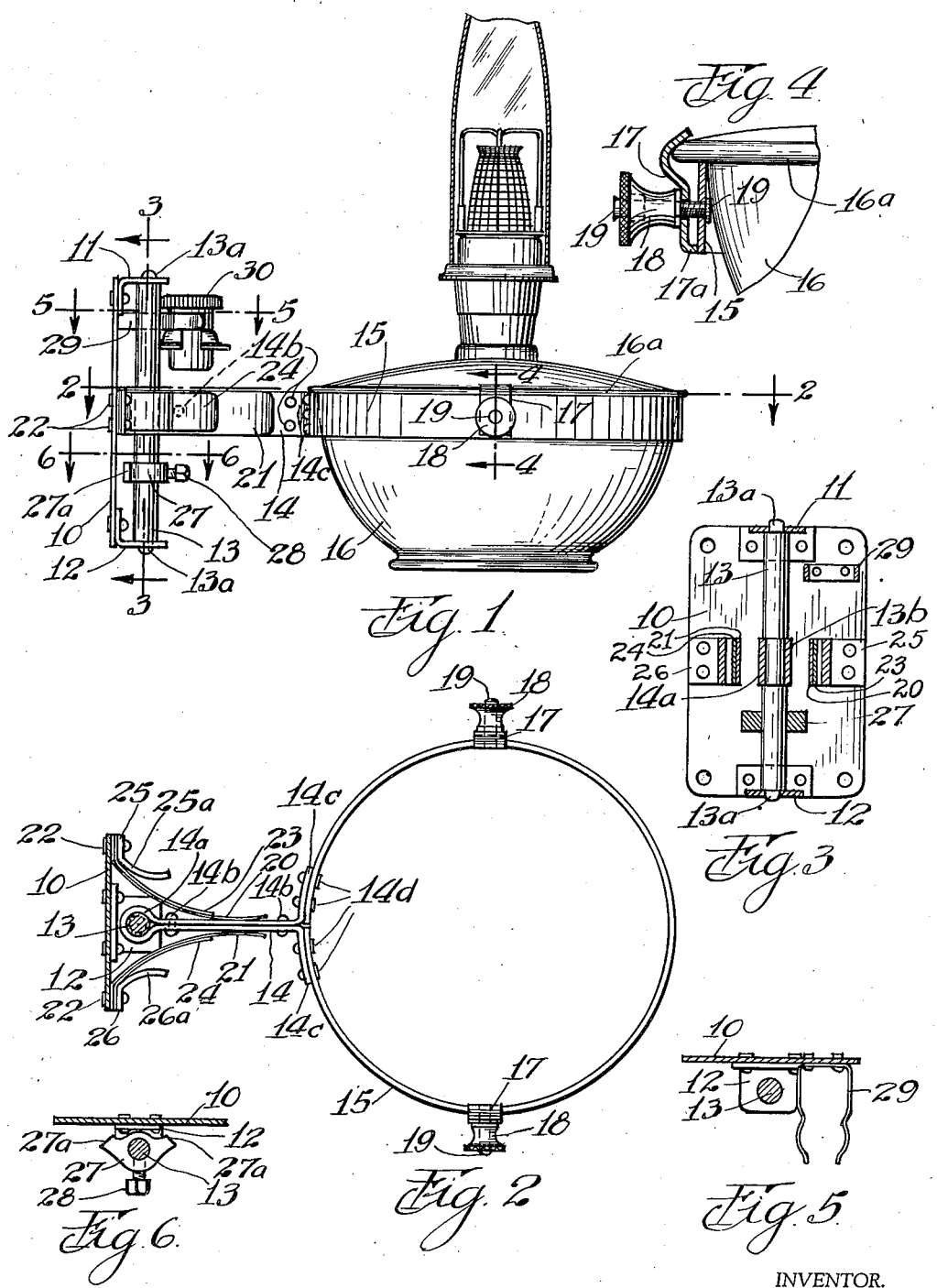

2,202,814

UNITED STATES PATENT OFFICE 2,202,814

BRACKET FOR LAMPS AND THE LIKE

Roy W. Hall, Berwyn, Ill., assignor to The Mantle Lamp Company of America, Chicago, Ill., a corporation of Illinois Application March 14, 1938, Serial No. 195,837

4 Claims.  (Cl. 248—289)

My invention includes an improved construction of a bracket and mounting devices therefor, adapted to support oil lamps employing mantles, as well as other articles, from side walls, and particularly so to do in locations where there is considerable vibration or shock, for example on railway cars, boats, automobile trailers and vehicles generally.

In carrying out my invention, I construct the bracket with a load support to conveniently receive and hold the bowl of the lamp, and clamping devices for preventing the accidental removal of the lamp therefrom, together with mounting devices for said support which will permit the lamp and its support to oscillate horizontally about a vertical axis, against spring pressures tending to hold the support in normal position, which usually is at right angles to the vertical supporting surface. By suitably constructing and proportioning the springs employed, any desired amount of cushioned oscillatory movement may be permitted, and any desired dampening of said movement may be secured, depending upon the weight of the lamp, or article supported by the bracket, and the nature and extent of the vibration or shocks that are to be guarded against in any case.

My invention will be best understood by reference to the accompanying drawing illustrating preferred embodiments thereof, in which—

Fig. 1 shows the preferred form of my bracket in side elevation and supporting a lamp of the kind referred to, Fig. 2 is a plan view of the bracket and mounting construction shown in Fig. 1, Fig. 3 is a vertical, sectional view through the mounting device shown in Fig. 1, taken along the line 3—3, in Fig. 1, Fig. 4 is a vertical, sectional view to an enlarged scale, of a part of the structure shown in Fig. 1, taken along the line 4—4 of Fig. 1.

Fig. 5 is a horizontal, sectional view of a part of the structure shown in Fig. 1, taken along the line 5—5 in Fig. 1, and Fig. 6 is a horizontal, sectional view of a part of the structure shown in Fig. 1, taken along the line 6—6 in Fig. 1.

Similar numerals refer to similar parts throughout the several views.

As shown in Figs. 1 and 2, my bracket construction includes a base plate 10 from the upper and lower portions of which bearings 11 and 12 extend to support an oscillatory rod 13 in vertical position. As shown in Fig. 3, the end portions of the rod 13 are shouldered and are of reduced diameter at 13a, to restrain said rod from longitudinal movement relatively to said bearings, and at its mid-portion said rod is of reduced diameter at 13b and shouldered to be engaged by one end of an arm 14 of a height equal to the length of said rod portion 13b, said arm being formed by bending a metal strip 14a tightly around said rod portion 13b, so that the end portions of said strip may be held tightly in contact with each other as shown, by suitable means, for example, rivets 14b, said end portions terminating in similar and oppositely extending angle members 14c rigidly secured to a load-carrying support 15 by suitable means, for example, rivets 14d, which support as shown comprises a continuous metal ring, although any other desired form of support may be employed, the only requisites being that the support shall be strong and rigid enough to support a lamp or other load without deformation in use, that substantially no vertical movement or vibration of the support relatively to the base plate 10 is permitted, and that the support may oscillate freely horizontally about a vertical axis extending through the bearings 11 and 12.

In Fig. 1 I illustrate the support 15 as carrying a kerosene mantle lamp 16, for which purpose my improved bracket is particularly adapted in any case where the supporting structure is subjected to vibrations or shocks that would be dangerous to the mantle of the lamp; it will be understood, however, that said bracket may also be employed to support other articles readily damaged by vibration or shock.

The support 15 as shown in Figs. 1 and 2, is provided with two diametrically opposed retaining clips 17 provided with clamping thumb nuts 18, for securely holding the supported article on said support. As shown in Fig. 4, each of the clips 17 is conformed at its upper end to engage and overlap a flange 16a extending from the body of the lamp 16 and resting on the support 15, said clip being inturned at its lower end 17a to rest against the outer surface of the support 15, to insure tightly clamping the flange 16a when the thumb nut 18 on a screw 19 carried by the support 15 and extending through the clip, is tightened.

As shown in Figs. 1 and 2, leaf springs 20 and 21 are held upon opposite sides of the arm 14 by suitable fastening devices, for example rivets 22, extending through the bent end of each of said springs and through the base plate 10, to rigidly secure said springs to said base plate. The other end portions of said springs rest against opposite sides of the arm without connection therewith, to cushion and dampen oscillatory movement of the support 15 and its load, about the axis of the rod 13.

In Figs. 1 and 2, I show reinforcing leaf springs 23 and 24 adjacent the outer surfaces of and engaging the springs 20 and 21, said springs 23 and 24 having bent ends also secured to the base plate 10 by said rivets 22, clamping plates 25 and 26 being preferably employed in connection with said rivets outside of said springs, to rigidly secure said springs to said base plate.

The reinforcing springs 23 and 24 afford a convenient means for securing a variety of cushioning effects to meet the requirements of different conditions of use. In general, it is desirable that equal and opposed spring pressures shall be exerted on the arm 14 when it occupies its normal or neutral position which usually is perpendicular to the base plate 10; this spring relation insures the application of effective cushioning pressures to the arm 14, as soon as it is moved substantially from its normal position, which cushioning pressures may increase substantially proportionally to the deflection of the springs, and it further insures a substantial and resilient dampening effect for each reactive oscillation of the arm 14, rapidly and with few oscillations bringing said arm again to rest in its normal position, unless the vibrations or shocks applied to the bracket are continued or repeated. In some cases, it is desirable to develop the initial and opposed spring pressures on the arm 14, entirely by the springs 20 and 21, using the springs 23 and 24 to build up desired cushioning and dampening pressures; in other cases, it may be desirable to develop the initial and opposed pressures entirely by the springs 23 and 24; and in still other cases, it may be desirable to develop the initial and opposed pressures by both the springs 20 and 21 and the springs 23 and 24. Where it is desired to have the cushioning and dampening pressures develop more rapidly than proportionally to the arm movement from its normal position, the clamping plates 25 and 26 may be provided with rigid abutment members 25a and 26a adjacent and spaced from the springs 23 and 24, the shape of said members and the variation and amount of their spacing from said springs, determining the increase of said pressures relatively to displacement of the arm 14 from its normal position. Where pressures so increased are not desired, the abutment members may be omitted.

To protect the parts of the bracket from injury due to excessive shocks, I may provide the rod 13 optionally with a stop 27 rigidly secured to said rod, for example, by a set screw 28, the ends 27a of said stop, as illustrated in Fig. 6, having such spacing from the base plate 10, as to limit angular movement of the arm 14 in either direction from its normal position, to a desired amount.

In Figs. 1, 3 and 5, I show a spring clip 29 secured to the base plate 10, for example, by rivets, to support, for example, a wick trimmer 30, which is a great convenience where the bracket is employed to support mantle lamps. In other cases, the clip 29 may be conformed and adapted to hold any other desired accessory.

While I have shown my invention in the particular embodiments above described, I do not limit myself thereto as I may employ equivalents thereof without departing from the scope of the appended claims.

Having thus described my invention, what I claim is:

1. In a bracket of the class described, the combination of a load-carrying support, a base, an arm extending from said support and having mounting connection with said base providing for oscillatory movement of said support relatively to said base, and spring means cushioning said oscillatory movement, said spring means including a first leaf spring engaging each of the opposite sides of said arm in the direction of said oscillatory movement and supported by said base, and an auxiliary leaf spring engaging each of said first leaf springs and supported by said base.

2. In a bracket of the class described, the combination of a load-carrying support, a base, an arm extending from said support and having mounting connection with said base providing for oscillatory movement of said support relatively to said base, spring means cushioning said oscillatory movement, said spring means including a leaf spring carried by said base and engaging each of the opposite sides of said arm in the direction of said oscillatory movement, and an abutment for engaging each of said leaf springs when deflected and decreasing the unit deflection of said spring.

3. In a bracket of the class described, the combination of a supporting ring, an arm extending from said ring, a vertical pivot rod secured to said arm, a base having bearings supporting said pivot rod for oscillatory movement, and springs between said base and said arm and tending to hold said arm and said ring at the mid-position of their oscillatory movement, said springs being of flat sheet material secured at their inner ends to said base and at their outer ends pressing against opposite sides of said arm with balanced initial stresses for the mid-position of said arm.

4. In a bracket of the class described, the combination of a supporting ring, an arm extending from said ring, a vertical pivot rod secured to said arm, a base having bearings supporting said pivot rod for oscillatory movement, and springs between said base and said arm and tending to hold said arm and said ring at the mid-position of their oscillatory movement, said ring comprising a flat metal strip bent to annular conformation, and said arm comprising a flat metal strip bent tightly around and clamping said rod and having its end portions secured to said ring, said rod having a shouldered recess of reduced diameter fitting said arm.

ROY W. HALL.